UNITED STATES PATENT OFFICE.

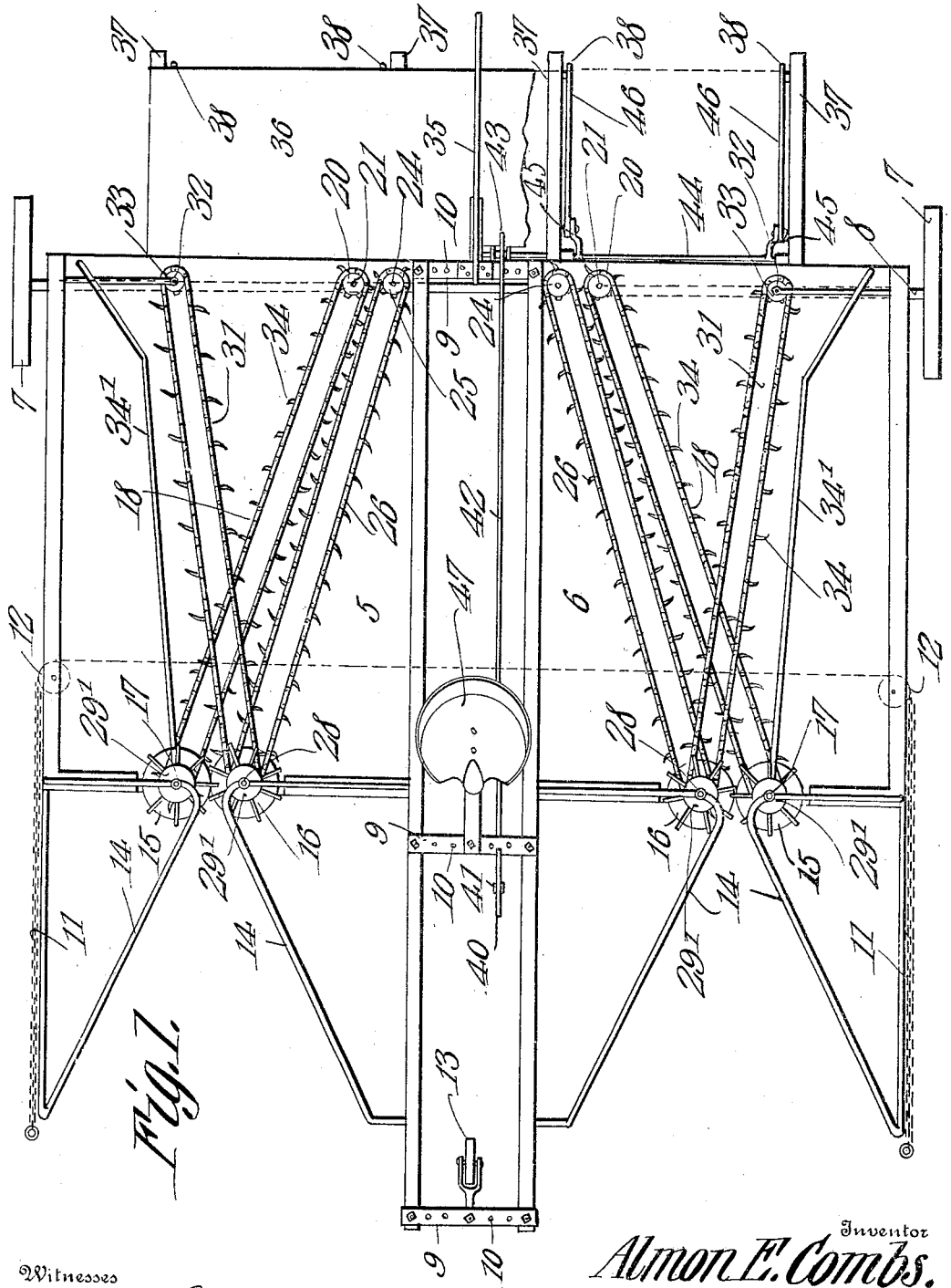

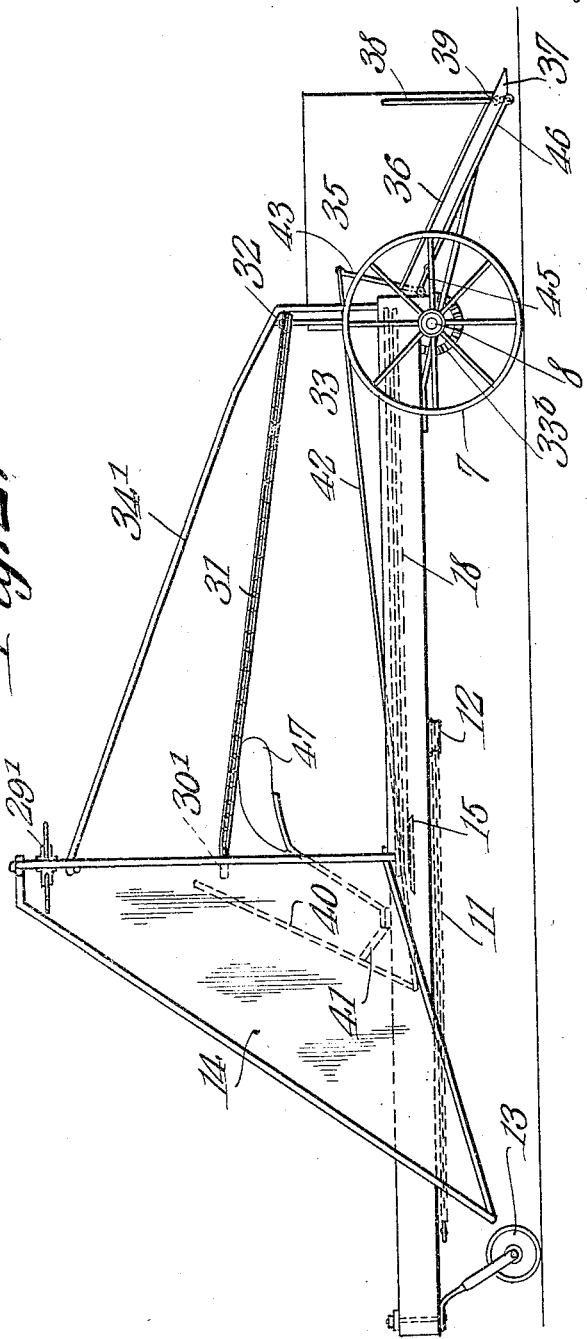

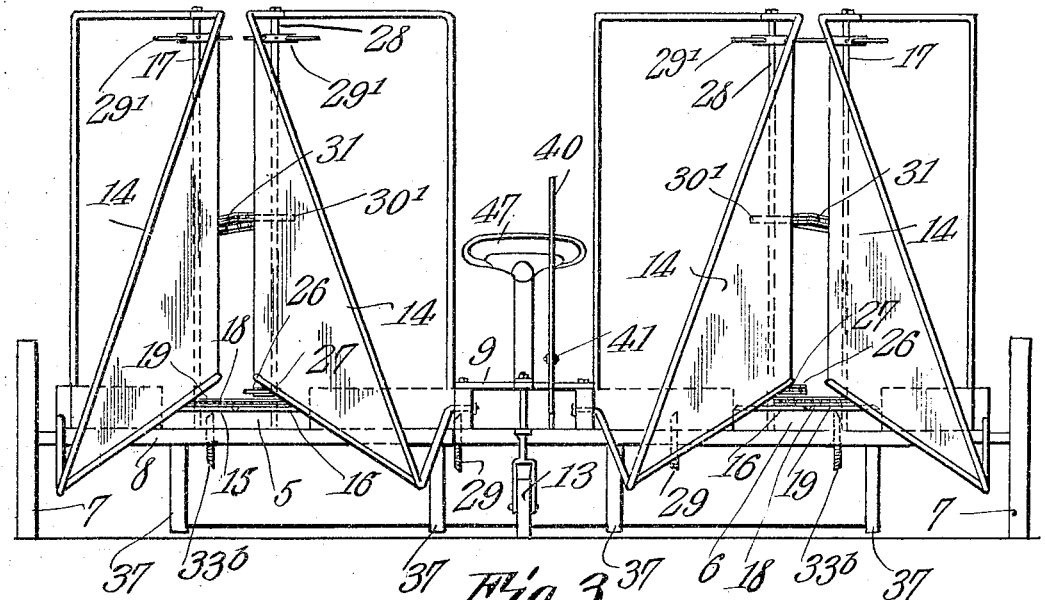

ALMON E. COMBS, OF JOHNSON, KANSAS.

CORN-HARVESTER.

No. 917,846.  Specification of Letters Patent.  Patented April 13, 1909.

Application filed November 27, 1908. Serial No. 464,591.

*To all whom it may concern:*

Be it known that I, ALMON E. COMBS, a citizen of the United States, residing at Johnson, in the county of Stanton and State of Kansas, have invented a new and useful Corn-Harvester, of which the following is a specification.

This invention relates to that class of corn harvesting machines in which the cutting apparatus is a pair of rotary cutters, between which the stalks are received, and whereby they are cut off as the machine is driven across the field.

The object of the present invention is to increase the capacity of the machine, it being constructed so as to operate on two rows simultaneously. Means are also provided for adjusting the machine according to the width of the rows.

A further object of the invention is to provide a carrier for the cut stalks, together with improved means for conveying the stalks thereto, and means for dumping the stalks when a sufficient quantity has accumulated on the carrier.

The invention also has for its object to provide means whereby the stalks are piled on the carrier with their butt ends presented in one direction, in order that they may be tied into shocks without stopping to assort the same.

Another object of the invention is to provide a machine of this kind in which the parts are few and simple, and which can be operated by one attendant, it requiring no attention other than driving it across the field, and periodically dumping the stalks. The latter can be done without stopping the machine, a hand lever for this purpose being provided, which is located adjacent to the driver's seat.

In the accompanying drawings:—Figure 1 is a top plan view of the machine: Fig. 2 is a side elevation: Fig. 3 is a front end view: Fig. 4 is a rear end view, partly broken away.

The supporting frame of the machine comprises a pair of platforms, 5 and 6, respectively, which are mounted at their rear ends on wheels 7, the axle of which is indicated at 8. Each platform carries a cutting apparatus, to be hereinafter described, in order that the machine may operate on two rows simultaneously. The platforms are connected at their inner ends by cross bars 9, bolted thereto, the cross bars being provided with a series of bolt holes 10, in order that the platforms may be set closer together, or spread apart, and thus adjusted to the width of the row. This adjustment is necessary for the reason that listed and planted corn rows differ in width.

The draft animals are hitched to a chain 11, which extends transversely beneath the platforms and passes, at the outer ends thereof, over pulleys 12, from which it extends forwardly, as shown in Fig. 1 of the drawings.

The front end of the machine is supported by a caster wheel 13, mounted on the front cross bars 9.

At the front end of each platform are the usual flared guides 14 for directing the stalks to the cutting apparatus, which, together with the operating mechanism thereof, is the same on both platforms.

The cutting mechanism comprises a pair of rotary disks 15 and 16 respectively, placed edgewise with respect to each other and having a peripheral cutting edge. These disks are located at the front ends of the platforms and sever the stalks as they enter therebetween, said stalks being guided to the disks by the guides 14. The cutting disk 15 is mounted on an upright shaft 17, which is supported in suitable bearings on the platforms. The shaft 17 is driven from the axle 8 by a sprocket chain 18 passing over a sprocket wheel 19 on the shaft 17, and a sprocket wheel 20 on an upright counter shaft 21 mounted on the platform at the rear end thereof. On the counter shaft 21 is a spur gear 22, which meshes with a similar gear 23 on a second counter shaft 24. On this last mentioned counter shaft is a sprocket wheel 25, which is connected by a chain 26 with a sprocket wheel 27 on the shaft 28 of the cutting disk 16. The chains 18 and 26 travel in different vertical planes, the sprockets over which they pass being positioned on their shafts accordingly. The purpose of this arrangement will be described hereinafter.

Motion is imparted to the chains from the axle 8 by means of a bevel gear 29 thereon, which meshes with a similar gear 30 on the counter-shaft 21 both chains being driven from the axle by reason of the gearing between the counter-shafts 21 and 24. At the upper ends of the shafts 17 and 28, and rotating therewith, are the usual reels 29', for gathering the stalks and throwing them against the cutting apparatus. The shaft 28 is also fitted with a sprocket wheel 30', which is connected, by a chain 31, to a sprocket 32 on an upright counter-shaft 33, mounted on the platform at the rear end thereof. On the shaft 33 is a bevel-gear 33$^a$, which meshes with a similar gear 33$^b$ on the axle 8. The gears 29 and 33$^b$ may be splined on the axle 8 in order that the platform adjustment hereinbefore referred to may be made. The chains 18, 26 and 31 also serve to convey the cut stalks to the rear end of the platform, they being provided with projecting fingers 34 to take hold of the stalks for this purpose.

As already stated, one of the objects of the invention is to deliver the cut stalks to the rear end of the platform with their butt ends all presented in one direction. This is done by tilting the stalks sidewise in transit to the rear end of the platform. The stalks are tilted as stated by locating the chains in different vertical planes, and diverging them in the direction of the rear end of the platform. The chains 18 and 26 are so located as to receive the butt ends of the cut stalks, and the chain 31 is in a higher vertical plane, so as to engage the heads of the cut stalks. The butt ends of the stalks are received between the chains 18 and 26, they being set sufficiently close together for this purpose, and the chains travel in a direction to carry the butt ends of the stalks rearwardly. Adjacent to the chain 31 is a guard rail 34' which slants in the direction of the rear end of the platform, and between the guard rail and said chain the heads of the stalks are received and carried rearwardly. By diverging the chains 18 and 26, and 31 in the direction of the rear end of the platform, it will be seen that the stalks, in transit thereto, are gradually tilted over to one side, and thus thrown on the carrier, to be presently described, cross-wise with respect to the machine, and with their butts all presented in one direction against a dividing board 35 on the carrier. The chains 18 and 26 are also positioned in different vertical planes, the chain 26 being the highest, which prevents the stalks from being held between said chains, so that they bend when they are tilted by the chain 31, and they therefore tilt more readily. The cutting apparatus, and the stalk conveyers of the respective platforms 5 and 6, are so arranged, that the cut stalks are delivered to the carrier in two piles, the stalks severed by the cutting apparatus of the platform 5 being delivered to the carrier on one side of the dividing board 35, and the stalks severed by the cutting apparatus on the platform 6 being delivered to the carrier on the other side of the dividing board 35, with the butt ends of the piles of stalks facing each other.

The carrier comprises a downwardly sloping platform 36, located at the rear end of each platform 5 and 6. The platform 36 is supported on arms 37 projecting from the rear ends of said platforms 5 and 6. At the lower ends of the platforms 36 are rearwardly tilting stalk-holding arms 38, which are pivoted at 39 to the arms 37. These arms 38 are operated by means of a hand-lever 40 pivoted at 41, on a bracket mounted on one of the cross bars 9, and connected by a rod 42 to an arm 43 projecting from a rock-shaft 44, mounted in suitable bearings at the rear ends of the platforms 5 and 6. From this rock-shaft projects a second arm 45, which is connected by a rod 46 to the lower ends of the arms 38.

It will be understood that each arm 38 is connected to the rock-shaft as herein described, so that when said rock-shaft is operated by the hand lever 40, all the arms will be tilted. On the cross bar 9 on which the supporting bracket of the hand lever 40 is mounted, is also mounted the driver's seat 47, which enables him to operate said hand lever to dump the load without leaving the seat, the hand lever being located so as to be within easy reach. When the arms 38 are in position to hold the stalks on the platforms, they are upright, as shown in Fig. 2. To dump the stalks from the platforms, the hand lever 40 is swung forwardly, which, by reason of its connection with the rock-shaft 44, and the connection between said rock-shaft and the arms 38, tilts the latter rearwardly, whereupon the stalks roll down the platforms on to the ground, by reason of the inclination of the platforms.

It will be seen, from the foregoing, that I have provided a corn harvester which is simple in construction and has no complicated parts to get out of order. By lining up the stalks, as stated, they can be at once tied into shocks without stopping to assort the same. Only one attendant is required to operate the machine, as it requires no attention other than guiding the draft animals, and periodically dumping the stalks.

The gears 22 and 23 are provided with a cover 48, to prevent the stalks from catching therein. The reels, and the sprocket wheels of the conveying mechanism are preferably mounted on their shafts in such a manner that they may be adjusted up and down thereon, according to the height of the stalks.

While I have shown the preferred form of mechanism for carrying out the inventive idea, it will be understood that various changes and modifications may be made without departing therefrom, and I do not wish to be limited except as indicated in the following claims.

What is claimed is:—

1. In a stalk-cutter, a stalk-holder receiving the cut stalks, and endless conveyers between which said stalks are received, for conveyers the same to the holder, said conveyers lying in different vertical planes, and diverging in the direction of the holder.

2. In a stalk-cutter, a stalk-holder receiving the cut stalks, a pair of lower endless conveyers between which the butt ends of the stalks are received, and an upper endless conveyer engageable with the tops of the stalks, said upper and lower conveyers diverging in the direction of the holder.

3. In a stalk-cutter, a holder receiving the cut stalks, endless conveyers between which the said stalks are received for conveying the same to the holder, said conveyers lying in different vertical planes, and diverging in the direction of the carrier, and a guard rail extending adjacent to the upper conveyer.

In testimony that I claim the foregoing as my own, I have hereto affixed my signature in the presence of two witnesses.

ALMON E. COMBS.

Witnesses:
 B. FRANKLIN FINN,
 J. B. REYNOLDS.